INVENTOR.
THOMAS E. MORRISON
BY Elliott & Pastoriza
ATTORNEYS 3,274,692
STUD LOCATING DEVICE
Thomas E. Morrison, 2658 Butler, Los Angeles, Calif.
Filed Jan. 14, 1964, Ser. No. 337,634
1 Claim. (Cl. 33—169)

This invention relates generally to measuring tools and more particularly to a novel device for locating objects such as wall studs which are normally invisible to a worker. The preferred embodiment of the present invention is used in conjunction with locating wall studs and for purposes of illustration, the invention will be described in conjunction with this application.

In adding partitions, hanging book shelves, or in securing other objects to walls, it is desirable to locate at least one of the studs behind the wall in order to provide a secure anchoring structure to which the object can be affixed. Location of a wall stud has been accomplished heretofore by simply tapping on the wall and attempting to distinguish between solid and hollow sounds. Alternatively, small holes have been drilled in the wall in an effort to locate one of the studs. These trial and error methods are time consuming, and if a number of small holes are drilled in the wall, they must be subsequently patched.

With the foregoing in mind, it is a primary object of this invention to provide a novel device which will greatly facilitate the location of a wall stud in a relatively short period of time and without the necessity of making more than one trial hole in the wall.

More particularly, it is an object to provide a locating device for a wall stud which is extremely simple to use and which is so designed as to enable location of the center of the stud so that a simple marking will indicate the proper place for driving nails or screws to strike the stud.

Other objects and advantages of this invention are to provide a simple wall stud locating device which is extremely economical to manufacture and which is substantially fool-proof in operation.

Briefly, these and other objects of this invention are attained by providing a guide means preferably in the form of an elongated curved guide tube forming part of or integrally secured to a body member. The tube itself is of a very small diameter and connects to the body member at a straight surface portion so that the tube extends from the body member in a direction normal to the straight surface portion. The far end of the tube, however, opens out in a direction substantially parallel to the straight edge portion of the body member.

Within the elongated tube there is provided a flexible wire, the ends of which extend from the opposite ends of the tube. The arrangement is such that the wire may be urged through the tube or retracted therefrom.

With the foregoing structure, a worker need only provide a very small opening in the wall sufficient to receive the elongated tube. The tube is then fed through the opening until the straight portion of the body engages the flat wall surface. The flexible wire is then urged from the outlet end of the tube behind the wall until it engages a stud. Thereafter, withdrawal of the elongated tube will enable the extent of wire from the end of the tube to be noted and thus provide an indication of the location of the stud.

A better understanding of the invention will be had by now referring to a specific embodiment thereof as described in conjunction with the attached drawing, in which.

Figure 1:
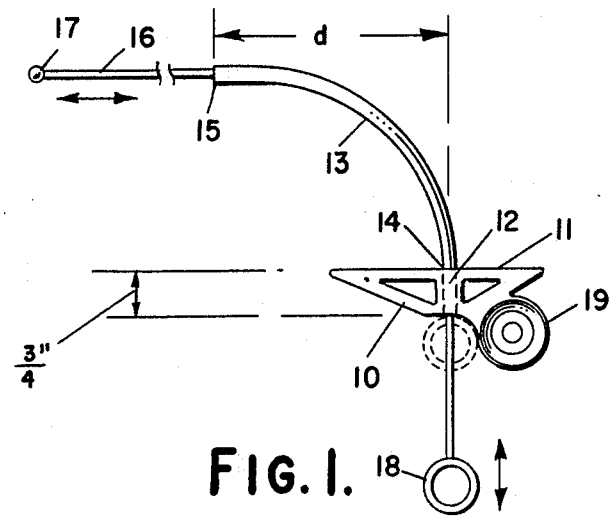
FIGURE 1 is a plan view of the stud locating device of this invention.

Referring first to FIGURE 1, the device comprises a body member 10 including a straight edge portion 11. The body also includes a bore 12 receiving the inlet end of an elongated guide means in the form of a tube 13. The tube 13 initially extends in a direction substantially normal to the straight edge surface 11 as at 14. The other end of the tube 13 terminates at an outlet end 15. The curve is such that the outlet end 15 faces in a direction generally parallel to the direction of the straight edge 11, as shown.

Cooperating with the member and tube is a flexible wire 16 passing through the tube and of a greater length than the tube such that its ends extend beyond the outlet and inlet ends of the tube as shown. Preferably, the wire includes at its end portion extending from the outlet end of the tube 13, an enlargement constituting a stop 17. The other end of the wire extending from the body 10 terminates in a handle or ring 18. The arrangement is such that the wire may be urged through or retracted through the tube 13 as indicated by the double-headed arrows adjacent the ends of the wire. The guide is held by the handle 19.

Figure 2:
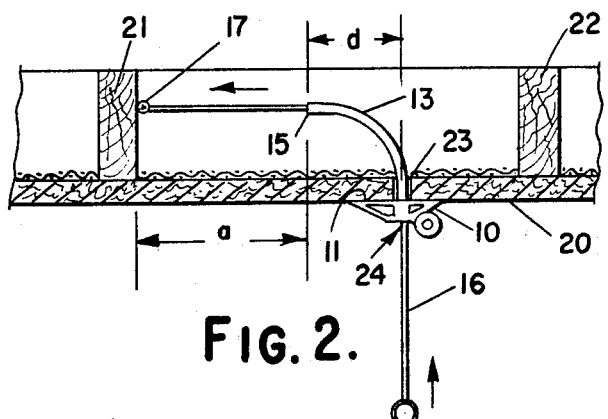
FIGURE 2 is another plan view on reduced scale illustrating the manner in which the device may be used to locate a wall stud; and, FIGURE 3 illustrates the manner in which the device is used subsequent to removal from the wall for enabling marking of the position of the located wall stud.

Referring now to FIGURE 2, the manner in which a stud is located by means of the tool of FIGURE 1 will be understood. As shown, there is a plaster wall 20 including vertical studs 21 and 22 disposed behind the wall. In the view of FIGURE 2, the stud would normally be projecting out of the plane of the paper, the same being shown in cross-section looking down on the wall. In using the device to locate one of the studs, a small hole 23 is first formed at a point where a stud is assumed to exist. If no stud is present, the elongated guide tube 13 and wire 16 are then worked through the hole 23 until the straight edge portion 11 seats flush against the flat wall surface 20. To facilitate this initial insertion, the wire 16 is retracted all the way through the tube 13 until the enlargement stop 17 engages the outlet end 15 of the tube 13.

After the straight edge portion 11 of the body 10 is seated against the flat surface of the wall, the straight edge is aligned in the direction of the stud. In the case of a wall stud, this would be a horizontal direction. The wire 16 is then urged into the body member 10 and through the curved tube 13 until its enlarged end stop 17 engages the stud 21 as shown. After this operation, there are two means of marking the position of the stud.

In the first method, the wire 16 is frictionally retained within the elongated tube 13 in its set position as shown in solid lines in FIGURE 2. The entire tube 13 and wire 16 are then withdrawn through the opening 23 without moving the wire 16 relative to the body 10. After removal, the body 10 may be placed flat against the wall with the extending portion of the wire 16 from the body member lying in a vertical direction, the inlet opening of the guide tube 13 being disposed adjacent the hole 23. The curved tube portion 13 and wire portion extending from the outlet end 15 will then lie along the wall surface in a horizontal direction and the end 17 will then locate the edge of the stud on the wall surface. By adding ¾", the center of the stud is located.

In the second method of locating the stud, the user may retract the wire 16 through the elongated tube 13 after the end thereof has been caused to engage the stud 21. In so retracting the wire, the user will place his thumb at the position 24 where the wire entered the body 10 so that this position will be noted. The wire is then retracted and the elongated tube 13 removed from the hole 23.

Figure 3:
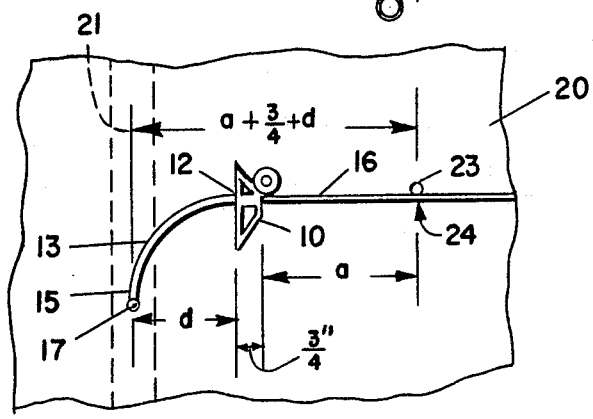

Referring to FIGURE 3, the point 24 on the wire 16 at which the user has disposed his thumb and which denoted the point at which the wire 16 exits from the body 10, is disposed adjacent the hole 23 in the wall. The length of wire retracted is indicated at $a$ in FIGURE 3 and corresponds exactly to the dimension $a$ shown in FIGURE 2 between the outlet opening 15 of the curved tube 13 and the right side of the stud 21. It will be clear accordingly that if the wire is caused to lie in a direction towards the stud 21 as shown in FIGURE 3, this distance $a$ in addition to the distance $d$ which denotes the distance of the outlet end of the tube 13 from the straight edge portion of the body 10, plus the length of the bore 12 within the body, constitutes the total overall distance from the opening 23 to the center of the stud. In other words, the length of the bore 12 in the body 10 is made ¾ of an inch which constitutes substantially one-half the thickness of the stud 21. Thus, when the device is positioned on the wall as shown in FIGURE 3, the end of the tube 13 or the stop 17, since the wire has been retracted through the tube, will locate the exact center of the stud.

Since the distance $d$ is known, and since the length of the bore 12 is known, the user need only measure the dimension $a$ or the extent of retraction of the wire 16. To this dimension is added the ¾ of an inch denoting the length of the bore 12 and distance $d$ to provide an overall dimension. The user may then mark off this dimension from the hole 23 in a direction horizontal to the hole and thereby locate the center of the stud without having to reposition the device as described in conjunction with FIGURE 3.

From the foregoing description, it will be evident that the present invention has provided a very simple and reliable means for locating a stud. It will be evident that only a single hole need be made in the wall in order to locate the stud and that this hole may be relatively small in diameter since the guide tube 13 is made relatively small in diameter.

While the invention has been described with respect to locating a stud, it is clear that it may be used in an equivalent manner to locate any particular object wherein it is desired to provide an indication of the distance of the object from the guide means for the flexible wire. In addition, it will be clear that a second stud may be located by using the same wall hole and reversing the tube.

Various modifications falling clearly within the scope and spirit of this invention will thus occur to those skilled in the art. The stud locating device is therefore not to be thought of as limited to the exact structure set forth merely for illustrative purposes.

What is claimed is:

A stud locating device comprising, in combination; a body member having an elongated straight surface portion for engaging the flat surface of a wall and including an elongated wire guide tube having an inlet end secured to said body, said wire guide tube extending away from said straight surface portion and curving to terminate in an outlet end facing in a direction generally parallel to the direction of elongation of said straight surface portion so that the direction of said outlet end may be determined by the direction of said elongated straight surface; and a flexible wire received in said wire guide tube and of a length greater than the length of said wire guide tube so that the ends of said wire extend from said outlet and inlet ends of said wire guide tube whereby said wire guide tube may be passed through a small hole in said flat surface of said wall until said straight surface portion engages said flat surface, said straight surface portion being oriented at right angles to a stud in said wall to be located so that said outlet end is directed towards said stud, said wire then being urged through said wire guide tube until its end passing from said outlet end of said wire guide tube engages said stud in said wall, thereafter said wire guide tube being withdrawn and said stud being located by noting the extent that said wire was urged through said wire guide tube, and in which said wire is guided into said inlet end of said wire guide tube at a point on said body spaced a distance from said straight surface portion equal substantially to one-half the thickness of said stud, the end of said wire from the outlet end of said wire guide tube terminating in an enlargement constituting a stop whereby the center of said stud may be located by retracting said wire back through said wire guide tube after the end of said wire has been urged into engagement with said stud, until said stop engages said outlet end of said wire guide tube, the portion of wire adjacent said point on said body being noted prior to retraction so that said point may be disposed at said hole in said wall after removal of said wire guide tube from said hole with said retracted portion of said wire lying in the direction of said stud, the outlet end of said wire guide tube then denoting the center of said stud.

References Cited by the Examiner

UNITED STATES PATENTS

| | | | |
|---|---|---|---|
| 2,701,419 | 2/1955 | Des Voignes | 33—174 |
| 2,992,488 | 7/1961 | Berrett | 33—169 |
| 3,048,925 | 8/1962 | Klaus | 33—169 |

LOUIS R. PRINCE, *Primary Examiner.*

DAVIS SCHONBERG, *Examiner.*

D. M. YASICH, *Assistant Examiner.*